United States Patent [19]

Bauer et al.

[11] 4,262,963

[45] Apr. 21, 1981

[54] GUIDE RAIL ASSEMBLY FOR A VEHICLE SEAT

[75] Inventors: Heinz Bauer; Alfred Gedig; Reiner Frohnhaus; Burckhard Becker; Manfred Behrendt; Jürgen Busch, all of Solingen, Fed. Rep. of Germany

[73] Assignee: C. Rob. Hammerstein GmbH, Solingen, Fed. Rep. of Germany

[21] Appl. No.: 11,953

[22] Filed: May 21, 1979

[51] Int. Cl.³ .............................................. A62B 35/00
[52] U.S. Cl. .................................. 297/473; 248/429; 248/430; 296/65 R; 297/468
[58] Field of Search ................ 297/473, 468; 248/429, 248/393, 430; 296/65 R, 65 A; 308/3 R, 3.6

[56] References Cited

U.S. PATENT DOCUMENTS

| 3,207,554 | 9/1965 | Dall | 297/468 |
|---|---|---|---|
| 3,759,587 | 9/1973 | Christin | 312/341 X |
| 3,917,342 | 11/1975 | Furuta | 297/468 |
| 3,977,725 | 8/1976 | Tengler | 297/468 |
| 4,068,887 | 1/1978 | Babbs | 248/393 |
| 4,072,347 | 2/1978 | Boisset | 248/429 X |

Primary Examiner—James T. McCall
Attorney, Agent, or Firm—Michael J. Striker

[57] ABSTRACT

The guide rail assembly for a vehicle seat comprises two pairs of interhooked guide rails one being secured to the seat and the other to the floor of the vehicle. The seat rail includes a mounting member for safety belts and in the proximity of the mounting member is secured to a hook-shaped reinforcing member which engages a corresponding hook-shaped portion of a cooperating reinforcing rail which is secured to the stationary guide rail. The upper hook-shaped reinforcing member is dimensioned such as to be deformed in the case of excessive loads applied to the safety belt thus preventing the guide rails from being torn apart.

11 Claims, 9 Drawing Figures

GUIDE RAIL ASSEMBLY FOR A VEHICLE SEAT

BACKGROUND OF THE INVENTION

This invention relates generally to a guide rail assembly for supporting a vehicle seat and more specifically, it relates to a guide rail assembly of the type which includes at least two pairs of mutually engaging rails arranged respectively at lateral sides of the vehicle seat, one rail being secured to the seat and having mounting means for a safety belt, and the other rail being secured to the floor of the vehicle.

In contemporary designs of motor vehicles, the trend is to anchor safety belts directly on the seat and not on the body of the vehicle. Conventionally, the safety belts have a V-shaped structure defining a shoulder belt portion and a lower belt portion stretching over the lower part of the abdomen. The apex of the V-shaped belts is terminated with a buckle plug directed to the inner lateral side of the seat and insertable into a buckle socket secured to the inner side of the vehicle seat. By means of this arrangement it is assured that the position of the safety belt is substantially independent from the position of the vehicle seat so that irrespective of the adjustment of the seat position by short or tall persons, the position of the safety belt relative to the seat remains always the same and the safety belt can be used under most favorable conditions.

In this arrangement of safety belts, it is required that at least one pair of cooperating guide rails in the guide rail assembly be designed such that even in the case of an accident, especially in the case of a frontal or impact collision, the resulting inertial forces occurring during the abrupt acceleration or deceleration of persons using the seat, be transmitted from the guide rail assembly to the floor of the vehicle. Especially at a head-on collision of the motor vehicle, the safety belts secured to the seat overload the guide rail assembly supporting the seat particularly in the vertical direction. Consequently, it may happen in the course of such an accident that the interlacing rails are torn apart (separated) in the manner of a zipper and consequently, the user of the vehicle seat may suffer a serious unjury.

In conventional guide rail assemblies, the two interlaced guide rails have upwardly directed U-shaped sections, the shorter arms of which overlap each other. These U-shaped regions of the rails have a slim configuration whereby the short arms of respective rails engage each other in a mirror-like fashion and project almost entirely into the recess formed by the U-shaped end portion of the cooperating rail. By virtue of this slim profile the two rails engage each other over a relatively large vertical section. As a consequence, very high bending moments can be intercepted in vertical direction and the aforementioned tearing-off in a zipper-like manner is effectively prevented. Also the mirror-symmetrical hooking of the two rails contributes to the resistance of the guide rail assembly inasmuch as one rail is hooked up into the other to the same degree.

Nonetheless, the study of accidents and experiments have prooved that even in the conventional vertically oriented engaging pairs of guide rails, the possibility still exists that the two engaging rails can be torn apart from one another. Especially the engaged pair of guide rails situated near the central plane of the motor vehicle is susceptible to a rupture beginning at the rear end of the line of their engagement. To avoid this possibility it has been devised to dimension the material of the profiled rails such that forces of the strength up to 40 KN for example, that means up to 40,000 kg/m-sec$^2$ be absorbed without tearing apart the individual rails from the cooperating guide rails. By these measures, however, the weight of each rail pair is increased in a very disadvantageous manner.

SUMMARY OF THE INVENTION

A general object of this invention is, therefore, to provide a guide rail assembly for a vehicle seat which is not possessed of these disadvantages.

More particularly, it is an object of this invention to provide such an improved guide rail assembly which can withstand extremely high pulling forces and at the same time which is constructed with minimum material consumption and consequently is reduced in weight.

In keeping with these objects, and others which will become apparent hereafter, one feature of the invention resides in the provision of a pair of reinforcing members each having a shook-shaped cross-section and being arranged in the proximity of the mounting means for the safety belt, each member defining a shorter arm and a longer arm, the longer arm of one of the members being secured to the outer side of the seat rail and the longer arm of the other reinforcing member being secured to the outer side of the floor rail, and the shorter arm of respective members overlapping each other between their longer arms and extending parallel to the direction of movement of the seat rail.

By means of these reinforcing members which preferably have the form of hook-shaped rails it is attained that part of the guide rail assembly for a vehicle seat which due to the attachment of safety belts to the vehicle seat is most exposed to excessive forces is substantially reinforced. The engaging hook-shaped portions of reinforcing rails are formed such that they have maximum resistance to pulling forces independently from other requirements since the parallel guiding of seat and floor rails is taken over by sliding or rolling elements which are unnecessary for the reinforcing rails. The hook-shaped portions of the reinforcing rails are not, therefore, subject to any wear, are simple to install and can be easily fastened in any suitable manner to the conventional seat and floor guide rails. The hook-shaped portions of the rails require minimum space for installation and also the total weight of the guide rail assembly provided with the reinforcing rails remains very small.

The installation of the reinforcing rails of this invention is of particular advantage in the case when the safety belt is attached to the vehicle seat only at the center plane of the vehicle. In this one-point attachment of the belt to the seat, the requirement for rigidity of seat and floor rails of the supporting rail assembly are lower at the outer lateral side and higher at the central lateral side of the vehicle seat. It is, therefore, sufficient to install the reinforcing hook-shaped rails at the central lateral side only to provide a desirable reinforcement of the seat supporting guide rails. As a consequence, production, storing and assembly costs are substantially decreased.

Particularly advantageous is the combination of the hook-shaped reinforcing rails according to this invention with the seat supporting guide rail assembly having vertically extending profiles. Such supporting rails are very slim so that there is sufficient room for the installation of the reinforcing rails. In this combination it is also particularly advantageous when the direction of engagement of the hook-shaped portion of the reinforcing rails is reversed relative to the direction of engagement of corresponding U-shaped portions of the seat and floor rails of the guide rail assembly so that a mirror-symmetrical pattern of the engaging U-shaped portions will result. In the case of excessive loads, the mutually engaging U-shaped profiles of the rails have the tendency to extend and tear out from the mutual engagement. The reason for this tendency is the fact that the pulling forces act always against the outer arm of the U-shaped rails and consequently a rotary moment in the range of their contact takes place. In the mirror-symmetrical engagement of the reinforcing rails and of the guide rails the aforementioned rotary moments are substantially neutralized.

Furthermore, it is also of advantage when the reinforcing U-shaped portion associated with the stationary guide rail connected to the floor of the vehicle is made by stamping out the vertically extending wall of the stationary floor rail.

In order to prevent bending of the free arm of reinforcing rails, for example of the reinforcing hook-shaped rails secured to the floor rail, it is advisable to rigidly connect the free shorter arm at the rear end of the reinforcing rail to the parallel extending longer arm by means of a bridge welded between these two arms for example. Since the point of attack of forces transmitted from the common belt portion of the three-point anchoring arrangement of a safety belt takes place at the rear edge of the movable seat rail, the possibility of tearing-off the guide rail in this region is most probable because the weak points of the mutually engaging U-shaped profiles are always their free shorter arms. If the bending of this free arm is prevented so the rigidity of the entire guide rail assembly becomes substantially increased.

The hook-shaped portion of the reinforcing rail assigned to the seat rail of the guide rail assembly is connected to the top surface of the seat rail preferably by means of relatively narrow about 10 mm to 25 mm wide neck. This neck is deformable when subject to extremely high loads and adjusts itself to intertial forces in the actual pulling direction. In this manner it is attained that excessive forces acting against the safety belt are transmitted to the area of reinforcing rails in a most advantageous manner since the relatively narrow neck affects the adjustment to the inclination of the line of forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
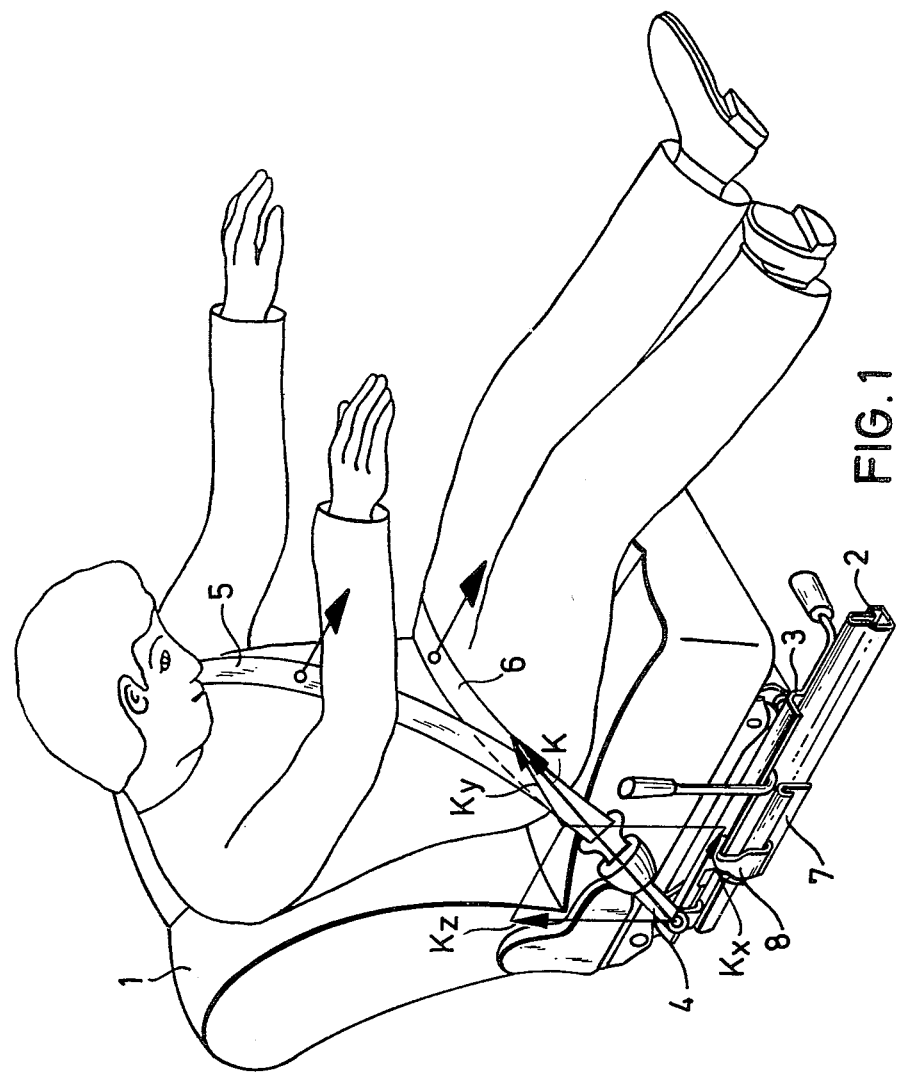
FIG. 1 is a perspective view of the guide rail assembly of this invention with the indication of inertial forces acting on a passenger in the case of a head-on collision.

Referring firstly to FIG. 1, vehicle seat 1 is connected to the floor of the vehicle by means of a guide rail assembly arranged at lateral sides of the seat. The part of the guide rail assembly assigned to one side of the seat includes a pair of rails 2 and 3 each having a vertically extending profiled cross-section. The stationary guide rail 2 secured to the floor of the vehicle encloses the movable rail 3 secured to the seat. In the rear region of the seat rail 3 there is provided an anchoring or mounting device 4 to which the buckling part of a safety seat belt 5 and 6 having a three-point attachment is secured.

As seen from FIG. 1, in the case of an accident, inertial forces acting against the seat belt result in a composite pulling force K acting substantially obliquely upwardly and slightly toward the center of the seat and is intercepted by the mounting device 4 situated at the rear region of the guide rail assembly. The resulting pulling force K is composed of three mutually perpendicular components $K_x$, $K_y$ and $K_z$, whereby the component $K_x$ acts in the direction of movement of the movable rail 3 and loads the arresting device of the latter. The force component $K_y$ which is directed to the center of the seat tends to move the seat to the left. The largest one of the three components, however, is the upwardly directed force $K_z$ which tends to tear apart the engaging guide rails 2 and 3.

In order to counteract the latter tendency, two mutually engaging hook-shaped reinforcing members 7 and 8 are rigidly connected to guide rails 2 and 3 so that force component $K_z$ of the resulting force K acting in the vertical direction against the rails 2 and 3 is neutralized by these additional reinforcing members. In other words, if the vertical component $K_z$ reaches a value at which the deformation of guide rails 2 and 3 is initiated at the rear region of the latter, so the interlocked U-shaped profiles of the reinforcing members 7 and 8 that are fixed to the floor rail and the seat rails 2 and 3 engage each other already at a very small deformation of this rear region of rails 2 and 3 and prevent effectively the tearing out of the latter from their mutual engagement.

Figure 2:
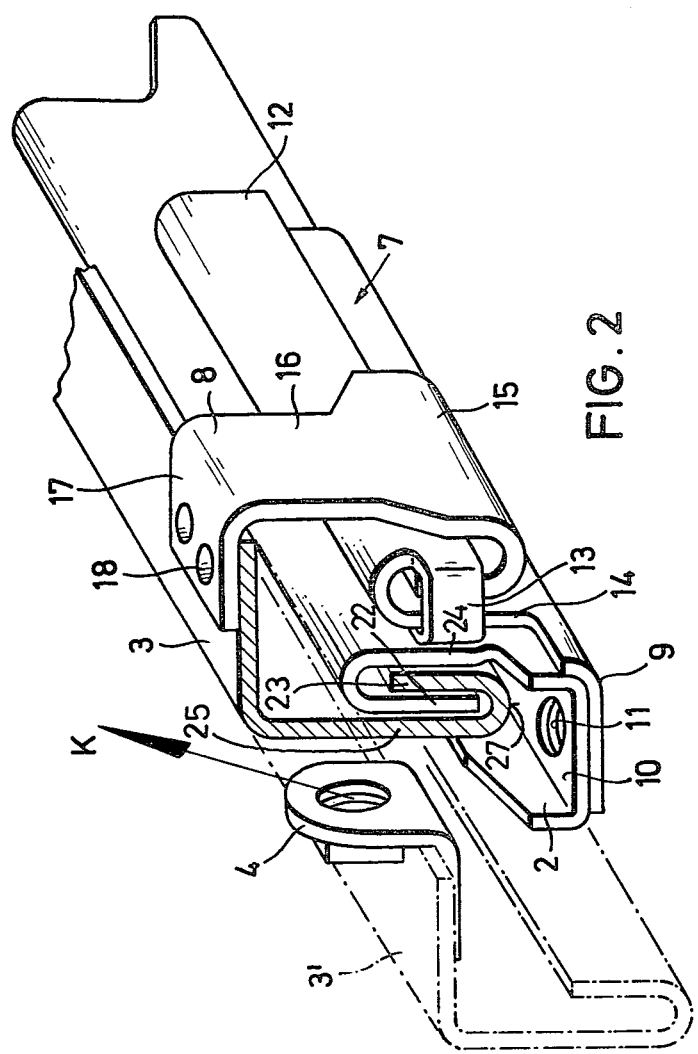
FIG. 2 is a perspective view partly in section of a vertically oriented pair of guide rails in connection with reinforcing members according to this invention.

The preferred embodiment of the structure of reinforcing members 7 and 8 is illustrated in FIG. 2. The hook-shaped reinforcing member 7 is in the form of a rail having a flange 9 projecting at a right angle under the base arm 10 of the stationary guide rail 2 connected to the floor of the vehicle and is welded thereto. The underlying flange 9 of the reinforcing rail 7 also reinforces the base arm 10 of the stationary rail 2. The rail 2 is fastened to the floor of the vehicle by means of screw bolts passing through openings 11. The base arm 10 of the stationary guide rail 2 is integral with vertically directed, U-shaped part 24 and 22 which is in engagement with the corresponding U-shaped part 23 and 25 of the movable seat rail 3. The outer surface of knee 27 of the U-shaped part of the seat rail 3 bears on non-illustrated rolling elements arranged in the longitudinal channel defined by the trough-shaped base part of the stationary rail 2 including the base arm 10.

The reinforcing hook-shaped member connected to the stationary floor rail has a length which corresponds substantially to the maximum range of displacement of the movable rails on the stationary rails. The hook-shaped reinforcing member 8 connected to the movable seat rail 3 has also a hook-shaped portion corresponding in section substantially to the hook-shaped portion of the reinforcing rail 7. The hook-shaped parts of reinforcing members 7 and 8 overlap each other between their longer arms but normally are without contact. Since the arms of the stationary reinforcing hook-shaped member 7 extend parallel to the stationary guide rail 2 and the arms of the upper reinforcing member 8 extend parallel to the movable seat rail 3, a contactless mutual engagement of the two reinforcing members is insured over the entire range of displacement of the guide rails 2 and 3.

A bridging piece or lug 14 rigidly connects the rear end of shorter free arm 12 of the stationary reinforcing member to the longer arm of the latter. By means of this rigid connection of the hook-shaped profile of the reinforcing rail 7 the rearward movement of the movable reinforcing member 8 is limited and at the same time the rigidity of the stationary reinforcing member in its rear region is substantially increased. As a result, excessive forces resulting during an accident, for example, are prevented from bending the hook-shaped part of the stationary reinforcing rail 7. It is recommended that the corresponding rear ends of guide rails 2 and 3 be rigidly connected by similar bridging pieces as indicated by way of an example in FIG. 3. Forces acting against safety belts 5 and 6 attached to the vehicle seat in the manner as indicated in FIG. 1 load the rear region of the guide rails 2 and 3 and tend to initiate the tearing out of the rails 2 and 3 in the manner of a zipper fastener.

Figure 9:
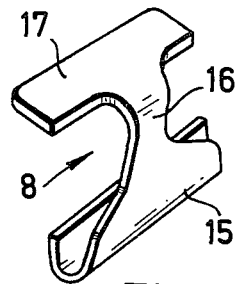
FIG. 9 is a perspective view of a seat rail.

As shown in FIGS. 1, 2 and 9, the hook-shaped reinforcing member 8 connected to the movable seat rail has a shorter length than the reinforcing member 7 connected to the stationary rail but it is also possible to reverse the ratio of the lengths of the two reinforcing members. The illustrated embodiments, however, are preferable in view of the transmission of successive forces. As can be seen from the drawings, the movable reinforcing hook-shaped member 8 has its longer arm reduced in width to form a relatively narrow neck 16, the width of which is about 15 to 20 millimeters when measured in the direction of displacement of the movable rail. The width and the thickness of the neck 16 is dimensioned such that when subject to extremely high forces it becomes deformed to match the direction of lines of transmitted forces. In this manner, the adjustment to inclined lines of action at extreme loads is attained and a favorable transmission of the forces is facilitated.

The end part of narrow neck 16 is bent at right angles and the projecting mounting arm 17 is fixed to the flat top surface of the movable seat rail 3. The fastening can be effected by means of two bolts passing through corresponding holes 18 in the seat rail 3 and the mounting arm 17. This disconnectable attachment by means of screw bolts is advantageous when dismantling the guide rail assembly or when the seat is to be removed from the motor vehicle and facilitates the manipulation in the limited space. Alternatively, it is also possible to fixedly attach the reinforcing hook-shaped member 8 to the seat rail 3 by welding.

Figure 4:
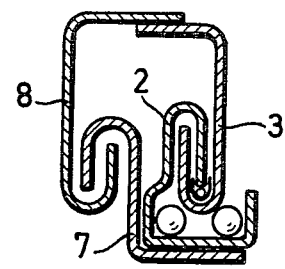
FIG. 4 is a sectional rear view of a part of the rail assembly similar to FIG. 2 in the region of the reinforcing members.
Figure 6:
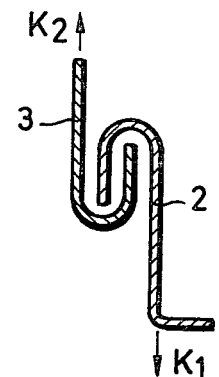
FIG. 6 is a sectional side view of engaging hook-shaped portions of guide rails with the indication of forces acting thereon.
Figure 8:
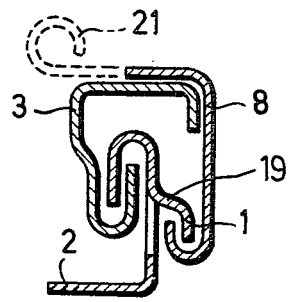
FIG. 8 is a sectional view of a guide rail assembly having stamped-out reinforcing hooks.

FIG. 6 indicates the direction of forces acting in the case of an accident against the vertically oriented U-shaped guide rails 2 and 3. Due to the asymmetrical arrangement of the rails 2 and 3 a rotary moment along a central longitudinal axis of the two rails takes place. Force $K_1$ is defined by the strength of the stationary rail 2 attached to the floor of the vehicle, whereas force $K_2$ corresponds substantially to the force component $K_z$ of FIG. 1. Since the two forces $K_1$ and $K_2$ are spaced apart from one another by the overlapping region of short arms of the U-sections of the rails, the hooked arms of the U-shaped sections are subject to bending and consequently tend to be torn out from their guiding engagement. For this reason, it is advantageous to reverse the direction of engagement of hook-shaped reinforcing members 7 and 8 to be mirror-symmetrical to the direction of engagement of the arms of guide rails 2 and 3 as indicated in FIGS. 4 and 8. In the case of occurrence of excessive forces, the rotational moment of the two pairs of engaging U-shaped portions compensate each other.

Figure 5:
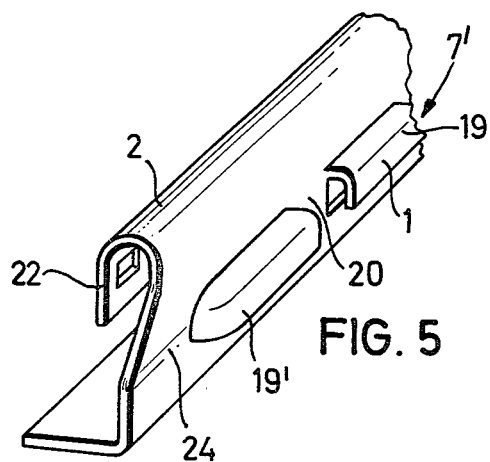
FIG. 5 is a perspective view of a modification of a floor rail having stamped-out hook-shapped portions of the lower reinforcing members.
Figure 7:
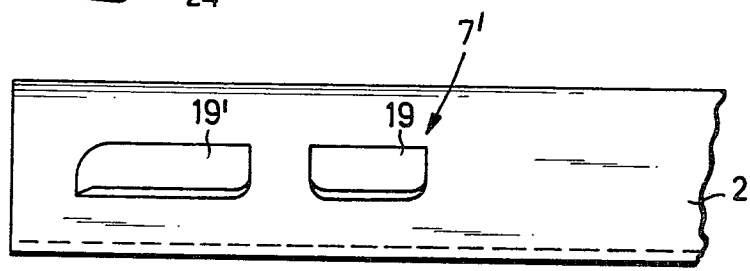
FIG. 7 is a side view of the rail of FIG. 5.

Referring now to FIGS. 5, 7 and 8 the shorter free arms of the hook-shaped part 12 of stationary reinforcing rail 7 (FIG. 2) can be substituted by hook-shaped portions 19 and 19' stamped out from the vertical wall of the stationary guide rail 2. The hooks 19 and 19' are stamped out outwardly and their upper edge is integral with the longer arm 24 of the stationary stamped area 20 in the arm 24 in order to enhance the rigidity of the stationary rail 2. The length of this non-stamped area 20 between the hooks 19 and 19' is about 20 millimeters. The length of the rear hook 19' is about 60 millimeters, its clearance from the rear end of the stationary rail 2 is preferably between 20 to 25 millimeters and the length of the subsequent hook is about 40 millimeters.

Figure 3:
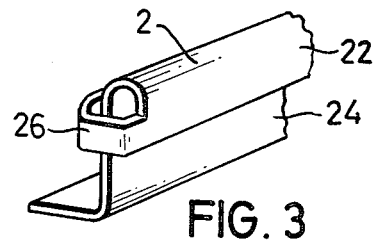
FIG. 3 is a perspective view of a reinforced stationary guide rail.

As can be seen from FIGS. 5 and 7, the rear end of the rear hook 19' is closed so that the reinforcing effect similar to that attained by bridges 13 and 26 in FIGS. 2 and 3 is attained. Instead of stamping out the hook-shaped portions from the stationary rail 2, it is also possible to stamp out the corresponding counterparts in the movable rail 3.

The stamped-out hooks 19 and 19' have the advantage that the overall width of the guide rail assembly including the reinforcing rails or members is smaller.

The mounting arm 17 of the reinforcing hook 8 assigned to the movable rail is formed into a bearing sleeve 21 for accommodating an actuation rod of an arresting lever for the guide rail assembly. In the shown exemplary embodiments, the reinforcing hook-shaped members 7 and 8 are fixed to the horizontally extending surface portion of the guide rails 2 and 3. It is also possible, however, to attach the reinforcing members directly to vertical walls of the guide rails or the stationary guide rails 2 can be attached to vertical walls of the vehicle body such as the walls of a central tunnel, for example.

It will be understood that each of the elements described above, or two or more together, may also find a useful application in other types of constructions differing from the types described above.

While the invention has been illustrated and described as embodied in a guide rail assembly for a vehicle seat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A guide rail assembly for a vehicle seat, comprising at least two pairs of engaging guide rails arranged respectively at lateral sides of the seat, a first rail of each pair being secured to the seat and including mounting means for a safety belt, and a second rail being secured to the floor of the vehicle; a first reinforcing hook-shaped member having a shorter hook-shaped portion and a longer portion, and a second reinforcing hook-shaped member having a shorter hook-shaped portion and a longer portion, said longer portion of said first reinforcing member being secured to said first rail in the proximity of said belt-mounting means, and said longer portion of said second reinforcing member being attached to said second rail, said shorter hook-shaped portions overlapping each other between said longer portions, said hook-shaped portion of said first reinforcing member being open downwardly, said hook-shaped portion of said second reinforcing member being open upwardly, said first guide rail and said second guide rail each having a vertically oriented U-shaped profile defining a shorter arm and a longer arm, said shorter arm exceeding at least three times the clearance between said arms, and said U-shaped profiles in each pair overlapping each other substantially over the whole length of said shorter arms, and said longer arm of each rail defining an end portion bent at right angles and extending below its shorter arm.

2. A guide rail assembly for a vehicle seat, comprising at least two pairs of engaging guide rails arranged respectively at lateral sides of the seat, a first rail of each pair being secured to the seat and including mounting means for a safety belt, and a second rail being secured to the floor of the vehicle, said second rail having a vertical wall; a first reinforcing hook-shaped member having a shorter hook-shaped portion and a longer portion; and a second reinforcing hook-shaped member, having a shorter hook-shaped portion and a longer portion, said longer portion of said first reinforcing member being secured to said first rail in the proximity of said belt-mounting means, and said longer portion of said second reinforcing member being attached to said second rail, said shorter hook-shaped portions overlapping each other between said longer portions, said shorter hook-shaped portion of said first reinforcing member being constituted of a stamped-out portion of said vertical wall of said second rail.

3. The assembly as defined in claim 1, wherein the hook-shaped portions of said reinforcing members are mirror-symmetrically arranged relative to the assigned U-shaped profiles of said guide rails.

4. The assembly as defined in claim 1, wherein the longer portion of each of said reinforcing hook-shaped members has a flat end portion bent at right angles to said longer portion and fixed to the assigned guide rail.

5. The assembly as defined in claim 4, wherein said flat portion of said longer portion at said first reinforcing member is fixed to the bottom surface of said second guide rail.

6. The assembly as defined in claim 5, wherein said flat end portion is fixed to said second guide rail by welding.

7. The assembly as defined in claim 2, comprising a plurality of successively arranged hook-shaped portions stamped out from the vertical wall of said second guide rail.

8. The assembly as defined in claim 1, wherein the end of said hook-shaped portion of said first reinforcing member is bridged by a rigidly connected bridging piece.

9. The assembly as defined in claim 1, wherein said longer portion of said second hook-shaped reinforcing member defines a neck portion reduced in width and dimensioned such as to be deformed by excessive forces occurring during an accident.

10. The assembly as defined in claim 1, wherein the end portion of said second hook-shaped reinforcing member is formed into a bearing sleeve for accommodating an arresting lever.

11. The assembly as defined in claim 8, wherein the end of said U-shaped profile of said second guide rail adjoining with the end of the associated reinforcing member is bridged by a rigidly connected bridging piece.

* * * * *